March 3, 1970   M. W. SCHOLFIELD   3,498,570
DIFFERENTIAL BRAKING SYSTEM FOR REELING APPARATUS
Filed July 31, 1967

Inventor
MAX. W. SCHOLFIELD.
BY
Mueller, Aichele + Rauner
ATTYS.

United States Patent Office 3,498,570
Patented Mar. 3, 1970

3,498,570
DIFFERENTIAL BRAKING SYSTEM FOR REELING APPARATUS
Max W. Scholfield, Goshen, Ind., assignor to International Radio & Electronics Corporation, Elkhart, Ind., a corporation of Indiana
Filed July 31, 1967, Ser. No. 657,168
Int. Cl. G11b 15/32
U.S. Cl. 242—203                    5 Claims

ABSTRACT OF THE DISCLOSURE

Motor breaking system for reeling apparatus, such as used in tape recorders, including first and second induction motors driving first and second reels, respectively, between which strip material is wound. The motors are energized by alternating current of different voltages for providing different speeds, and direct current is applied to the motors for braking the same to stop the reels. A smaller direct current voltage is applied to the motor connected to the take-up reel than to the motor connected to the pay-off reel by applying the braking voltage thereto through a differential resistance having a value which increases as the braking takes place. A self-heating positive temperature coefficient resistor such as an incandescent lamp can be used as the differential resistance.

BACKGROUND OF THE INVENTION

When reeling strip or sheet material, such as tape for a magnetic recorder or moving picture film, it may be desired to reel the strip material rapidly from one reel to the other. In doing this there is a problem when stopping the reeling action to prevent throwing or spilling of the strip material from the reel. Patent No. 2,873,318, issued Feb. 10, 1959, to Clarence C. Moore describes a system for providing differential braking by applying direct current to induction motors. The system of the Moore patent has been very effective to prevent spilling action when reeling tape by the use of dynamic braking wherein a larger direct current voltage is applied to the induction motor connected to the pay-off reel than to the motor for the take-up reel. This holds the tape taut so that it remains on the reels, and constitutes a significant improvement.

In order to provide effective action with very heavy braking, large differential action should be provided as the reels are brought to a stop. As the braking action is proportional to the speed (r.p.m.) the braking action is greatest when braking is first applied. The use of large differential action when braking is first applied will create a large difference in torques at the two reels. This will jerk the tape producing a strong tension in the strip material which can damage the same.

SUMMARY OF THE INVENTION

It is an object of the invention to provide a differential braking system for reels for strip material wherein more braking is applied to the motor for the pay-off reel than to the motor for the take-up reel, and the differential action increases as the reels slow down.

Another object is to provide a circuit for applying direct current for braking induction motors which drive tape reels, wherein the direct current applied to the take-up reel is reduced with respect to the current applied to the pay-off reel and the amount of reduction increases as the braking action continues.

A feature of the invention is the provision of a circuit for energizing induction motors used to drive reels for supporting strip material, such as magnetic recording tape, wherein direct current is applied to the motors for braking and the current is applied to the take-up reel motor through one or more light bulbs, the resistance of which increases with temperature, so that differential action is provided which increases during braking and reaches a maximum as the reels come to a stop.

In practicing the invention a driving and braking system is provided for reeling strip material, such as magnetic tape, between first and second reels. Induction motors are used and are energized by alternating current for driving the reels at various speeds and in different directions. To rapidly stop the reels, direct current is applied thereto with a lower voltage being applied to the motor attached to the take-up reel than to the motor attached to the pay-off reel to provide differential braking action so that the tape does not spill off of the reels. The voltage differential is provided by applying the direct current through a resistance to the motor for the take-up reel. This resistance can be a self-heating positive temperature coefficient resistor, such as a light bulb, so that the differential action increases as the braking continues to provide maximum differential action before the reels come to a stop.

DESCRIPTION OF THE PREFERRED EMBODIMENT

Figure 1:
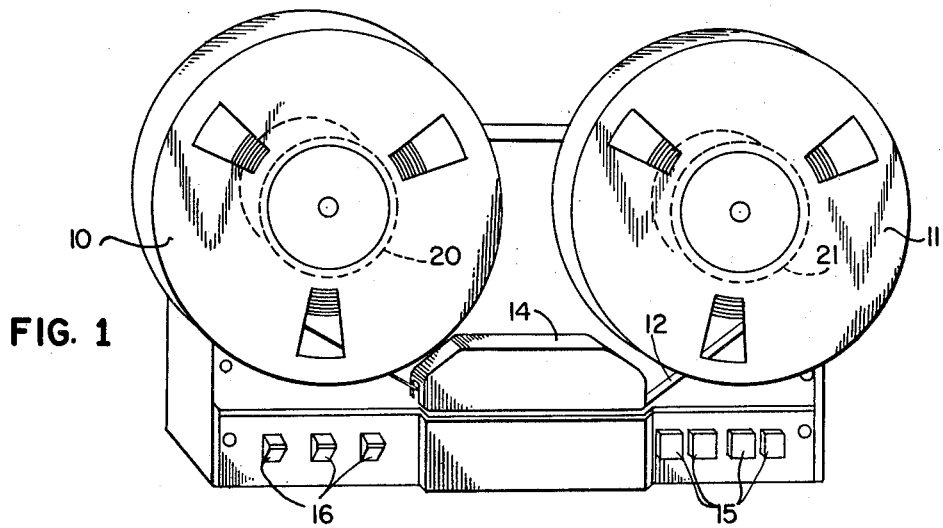
FIG. 1 illustrates a magnetic recorder utilizing the tape transport system of the invention.

Referring now to the drawings, in FIG. 1 there is illustrated a magnetic tape recording and reproducing device including reels 10 and 11 on which the magnetic tape is supported, with the tape 12 being wound from one reel to the other so that it passes by magnetic recording and reproducing unit 14. An induction motor 20 is directly coupled to reel 10 to drive the same, and induction motor 21 is directly coupled to reel 11. The reproducing unit 14 includes magnetic heads for recording, reproducing and erasing magnetic impulses on the tape, and a pressure roller which holds the tape against a capstan driven by a third motor to provide highly accurate tape speed for recording and reproduction. The reproducing unit may be of known construction and is not part of this invention. The control system for transporting the tape is actuated by a plurality of pushbuttons 15. Switches for applying power are shown at 16.

Figure 2:
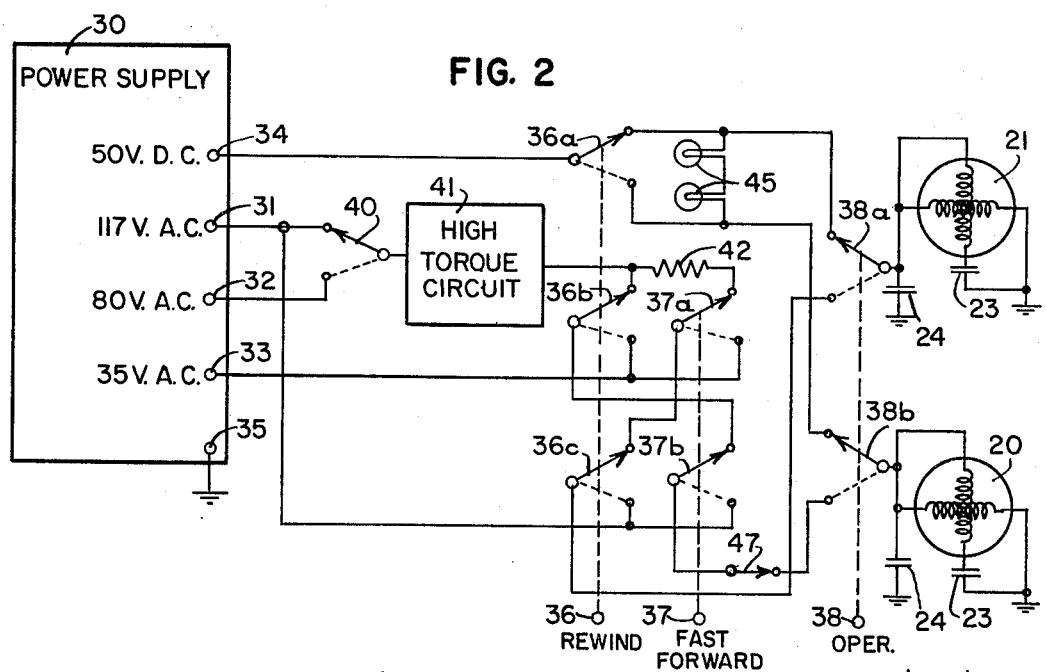
FIG. 2 is a circuit diagram of the circuit for applying energizing and braking potentials to the reel motors.

FIG. 2 shows the circuit for energizing the induction motors 20 and 21. The motors are of the split phase type and a capacitor 23 is connected in series with one phase winding of each motor across the supply potential. These capacitors can be mounted on the motors as a part thereof to provide a two terminal unit. A capacitor 24 is connected across each motor to reduce sparking during the switching operation. The power supply 30 may be of known construction and energized from the standard alternating current lines. The power supply provides alternating current outputs of 117 volts at terminal 31, 80 volts at terminal 32, and 35 volts at terminal 33. A 50 volt direct current output is provided at terminal 34. All of the voltages are referenced to ground through terminal 35.

Various voltages are applied to the motors 20 and 21 through operation of the switches 36, 37 and 38. Switch 36 has contacts 36a, 36b and 36c, switch 37 has contacts 37a and 37b, and switch 38 has contacts 38a and 38b. The switches 36, 37 and 38 can be mechanical switches or can be relays operated through a control system actuated by the pushbuttons 15 in FIG. 1. The switches are shown in FIG. 2 in their off positions in solid lines, and in their actuated positions by dotted lines.

Switch 38 when actuated supplies alternating current to the motors 20 and 21 to cause movement of the tape at the speed for recording or reproducing. As previously stated, a third motor drives a capstan engaging the tape to provide highly accurate tape movement. Switch 37 when opearted with switch 38 causes the tape to move in the same direction as when recording or reproducing but at a faster speed so that less time is taken to move the tape from one reel to the other. Switch 36 is operated with switch 38 to rewind the tape or move it in the opposite direction to that for recording or reproducing, and this also provides operation at fast speed. Switch 38 must be on for operation in either one of the three modes, and in its off position, as illustrated, to stop the reeling for all modes of operation.

Tracing the circuits for energizing the motors, when switch 38 is actuated to energize the motors for recording or reproducing, alternating current is applied through switch 40 and high torque circuit 41, and through contacts 36d, 37d and 38d to the motor 20. Switch 40 is selectively connected to terminal 31 or terminal 32 of the power supply to apply an alternating current energizing potential or either 117 or 80 volts. The position is selected depending upon the size of reels being used on the recorder, and when large reels are used 117 volts is applied and for small reels 80 volts is applied. The high torque circuit 41 provides full voltage to the motor 20 initially to provide high starting torque. This circuit inserts resistance to decrease the voltage applied to the motor 20 after it has started. In the operating positions the voltage from the high torque circuit 41 is also applied through resistor 42 and switch contacts 37a, 36c and 38a to the motor 21. This voltage is dropped by resistor 42 to a low value and acts to provide a drag to the motor 21 to hold the tape taut.

When it is desired to stop the tape winding, switch 38 is released and direct current from terminal 34 is applied through switch contacts 36a and 38a to the motor 21. The motor 21 is coupled to the reel from which the tape is being payed off and the direct current applied thereto provides heavy braking of this motor. The direct current braking potential is also applied through lamps 45 and contact 38b to the motor 20. The lamps operate to drop the potential applied to the motor 20 so that less braking is applied to this motor which is connected to the reel on which the tape is being wound. The greater braking applied to the pay-off reel motor acts to hold the tape taut as the reel slows down so that the tape is not thrown or spilled off the reel. The lamps 45 act as a self-heating positive temperature coefficient resistor to increase the drop in the direct current voltage applied to the motor 20. This increases the differential braking action so that the differential is greater as the motor is slowed down. Preferably the differential action will be increased to a maximum at the time the motors come to a stop.

Switch 47 connected in the circuit between contacts 37b and 38b permits interruption of current to the motor 20 to stop the tape feed for editing purposes.

For fast forward operation, switches 37 and 38 must both be closed. The 117 volt alternating current potential from terminal 31 is then applied through switch contacts 37b and 38b to the motor 20. The 35 volt alternating current potential is applied from terminal 33 through switch contacts 37a, 36c and 38a to the motor 21. This causes the full 117 volt potential to be continuously applied to the take-up reel motor 20 so that it operates at maximum speed. The 35 volt alternating current potential applied to the motor 21 provides drag thereon so that the tape is held taut. To stop the fast forward reeling, switch 38 must be released. This applies the direct current potentials to the motors in the manner previously described to provide differential braking, with the differential action increasing as the motors slow down.

For rewind or high speed reverse operation, switch 36 is operated along with switch 38. In such case switch contacts 36c apply the 117 volt potential through contacts 38a to the motor 21 to provide full energization thereof so that the reel 11 on which the tape is being wound is driven at maximum speed. The 35 volt alternating current potential is applied through contacts 36b, 37b and 38b to motor 20 to provide a drag on this motor for holding the tape taut. To stop the rewind operation, switch 38 must again be released. Since switch contact 36a is in the actuated or dotted position the full 50 volt direct current potential will be applied through contacts 38b to the motor 20 to provide maximum braking action at this motor. The 50 volt direct current potential will be applied through the lamps 45 and contacts 38a to the motor 21 to provide reduced braking at this motor. Accordingly, the differential braking action is now reversed with motor 20 providing heavier braking than motor 21. Lamps 45 will again present increased resistance as the elements thereof heat up to further reduce the braking potential applied to motor 21. This increases the differential braking action as the motors slow down.

In a system using induction motors operated from a nominal 110 volt alternating current supply, a 50 volt direct current braking voltage has been satisfactorily used with two number 304 lamps in series providing the differential action. That is, the lamps 45 in FIG. 2 would each be a number 304 lamp.

As previously stated, the switches 36, 37 and 38 can be operated by a relay control system controlled by the pushbuttons 15 shown in FIG. 1. This can be arranged so that the one pushbutton operates switch 38 and other controls for providing recording operation. A second pushbutton can operate switches 37 and 38 simultaneously for fast forward movement, and a third pushbutton can operate switches 36 and 38 simultaneously for rewind operation. The fourth pushbutton can release the switch 38 to stop tape movement for all modes of operation. The control system can release switches 36 and 37 automatically when the tape movement has stopped.

It will be apparent that other circuit arrangements utilizing positive temperature coefficient resistors for differential braking action can be used within the spirit and scope of this invention. The use of the positive temperature coefficient resistance so that the differential action increases provides a large differential action after the reels have slowed down and just before they stop, and at the same time a smaller differential action when the reels are moving fast and the braking action is greater. This prevents damage to the tape and at the same time provides a fast stop when the tape is being wound rapidly, either in the forward or reverse direction.

What is claimed is:

1. In a device having first and second reels on which an elongated strip of material is wound with the strip extending between the reels, apparatus for winding the strip from one reel to another including in combination, first and second induction motors individually coupled to the reels for driving the same, energizing circuit means for selectively providing alternating current and direct current potentials to said first and second motors, and resistance means connected to said energizing circuit means and having increased resistance in response to current flow therethrough, said energizing circuit means including switch means for applying alternating current potential to said first motor for driving the reel associated therewith to wind the strip thereon, said switch means having portions for applying direct current potentials to said first and second motors for braking the same with said direct current potential being applied through said resistance means to said first motor for braking said first motor to a lesser degree than said second motor, and with the increased resistance of said resistance means causing the braking of said first motor to decrease as the braking action continues.

2. Apparatus in accordance with claim 1 wherein said resistance means includes a directly heated positive temperature coefficient resistor which reduces the direct current applied to said first motor as said braking continues to increase the differential between the braking action of said first and second motors.

3. Apparatus in accordance with claim 1 wherein said resistance means includes an incandescent light bulb having a positive temperature coefficient of resistance.

4. Apparatus in accordance with claim 1 wherein said switch means further includes a portion for applying alternating current potential to said second motor for driving the reel associated therewith to wind the strip thereon and portions for applying direct current potentials to said first motor for braking the same and to said second motor through said resistance means for lesser braking thereof, and with the increased resistance of said resistance means causing the braking of said second motor to decrease as the braking action continues.

5. Apparatus in accordance with claim 4 wherein said energizing circuit means includes first and second conductors for applying the direct current potential to said first and second motors respectively and said resistance means is connected between said first and second conductors, and said switch means applies the direct current potential selectively to said first conductor for providing greater direct current braking potential to said first motod than to said second motor and to said second conductor for providing greater direct current braking potential to said second motor than to said first motor.

References Cited

UNITED STATES PATENTS

| 2,873,318 | 2/1959 | Moore | 242—55.12 X |
| 3,211,981 | 10/1965 | Jordan | 318—212 |
| 3,141,626 | 7/1964 | Hoskin | 242—55.12 |
| 3,217,993 | 11/1965 | Blakistone | 242—55.12 |
| 3,218,529 | 11/1965 | Evans et al. | 318—7 |

GEORGE F. MAUTZ, Primary Examiner

U.S. Cl. X.R.

318—7